US010095792B2

(12) United States Patent
Kim

(10) Patent No.: US 10,095,792 B2
(45) Date of Patent: Oct. 9, 2018

(54) METHOD AND APPARATUS FOR PROVIDING SEARCH SERVICES INTERACTIVELY DISPLAYING A TYPE OF SEARCH TARGET

(75) Inventor: Dong Wook Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 149 days.

(21) Appl. No.: 13/565,569

(22) Filed: Aug. 2, 2012

(65) Prior Publication Data

US 2013/0041911 A1   Feb. 14, 2013

(30) Foreign Application Priority Data

Aug. 10, 2011 (KR) .................. 10-2011-0079563

(51) Int. Cl.
*G06F 7/00* (2006.01)
*G06F 17/30* (2006.01)

(52) U.S. Cl.
CPC .. *G06F 17/30867* (2013.01); *G06F 17/30023* (2013.01)

(58) Field of Classification Search
CPC ......... G06F 17/30424; G06F 17/30654; G06F 17/30675; G06F 17/30109; G06F 17/30867; G06F 17/30023
USPC ....................................................... 707/706
See application file for complete search history.

(56) References Cited

U.S. PATENT DOCUMENTS

| 5,903,892 | A | 5/1999 | Hoffert et al. | |
| 2005/0154723 | A1* | 7/2005 | Liang ............... | G06F 17/30109 |
| 2008/0082490 | A1 | 4/2008 | MacLaurin et al. | |
| 2009/0217168 | A1* | 8/2009 | Dexter et al. ................. | 715/731 |
| 2011/0055189 | A1* | 3/2011 | Effrat et al. ................... | 707/706 |
| 2011/0078127 | A1* | 3/2011 | Lin et al. ...................... | 707/706 |

FOREIGN PATENT DOCUMENTS

| JP | 2004-302660 A | 10/2004 |
| JP | 2007213569 A | 8/2007 |
| KR | 10-2009-0003464 | 1/2009 |
| KR | 10-2009-0013647 | 2/2009 |
| KR | 1020090107303 | 10/2009 |

(Continued)

OTHER PUBLICATIONS

European Patent Office, Extended European Search Report for Application No. 12179787.2-1225, dated Jan. 4, 2013.

(Continued)

*Primary Examiner* — Boris Gorney
*Assistant Examiner* — Christy Y Kim
(74) *Attorney, Agent, or Firm* — Harness, Dickey & Pierce, P.L.C.

(57) ABSTRACT

An approach is provided for search services. User-defined search input is received by at least one processor. At least a portion of the user-defined search input is determined, via the at least one processor, as corresponding to at least one functional keyword associated with a type of object to be searched. Classification information is generated to facilitate identification of the at least one functional keyword among at least one other portion of the user-defined search input. Search information is generated about at least one object relating to at least some of the user-defined search input based on at least some of the classification information.

29 Claims, 9 Drawing Sheets

(56) References Cited

FOREIGN PATENT DOCUMENTS

KR    10-2010-0049802    5/2010

OTHER PUBLICATIONS

Stefan Grothkopp, "Welcome to goosh.org—the unofficial google shell," Goosh, Jun. 23, 2008, URL: http://www.goosh.org/#help.
Charly Kuhnast, "Aus dem Alltag eines Sysadmin: Goosh," Linux Magazin, Mar. 31, 2011, URL: http://www.linux-magazin.de/Heft-Abo/Ausgaben/2011/03/Einfuehrung2.
Japanese Office Action dated Feb. 9, 2016, corresponding to Japanese Patent Application No. 2012-174199.
Japanese Office Action dated Jun. 13, 2017 for corresponding Japanese Patent Application No. 2016-115640.
Korean Office Action dated Oct. 23, 2013 issued in corresponding Korean Application No. 10-2011-0082769.

* cited by examiner

610 — | NHN  [phone number]  [= 1588-0000] |
         910              920

950

610 — | one dollar  [exchange rate]  [= 1010Won] |
          960              970

METHOD AND APPARATUS FOR PROVIDING SEARCH SERVICES INTERACTIVELY DISPLAYING A TYPE OF SEARCH TARGET

CROSS-REFERENCE TO RELATED APPLICATION

This application claims priority from and the benefit of Korean Patent Application No. 10-2011-0079563, filed on Aug. 10, 2011, which is hereby incorporated by reference for all purposes as if fully set forth herein.

BACKGROUND

Field

Exemplary embodiments of the present disclosure relate to a method and apparatus for providing a search service. More particularly, exemplary embodiments relate to a method and apparatus for extracting, in response to user search text input, a portion of text indicating a type of a search target from a portion of the search text or the search text as a whole, and displaying an extracted portion of the search text corresponding to a type of a search target so that the search target may be identified.

Discussion

An Internet (or otherwise networked) search service may correspond to a service of searching for information associated with one or more keywords input by, for example, a user and, in certain instances, may include or correspond to information provided on the Internet (or any other suitably networked source), and providing a search result based on the one or more keywords. Generally, the search result may include a summary of and/or a link to found information. A user verifying the found information included in the summary may access the found information, as desired, via the link. In this manner, a World Wide Web (WWW) server, a file transfer protocol server, and/or the like may be accessed so as to enable the user to obtain the information.

In general, an Internet search service may provide, as a search result, information about a web document including a user input search query. The search query may correspond to search text including one or more characters, numbers, symbols, special characters, and/or the like. The search text may include at least one keyword.

With developments in search technology, search targets have been expanded from conventional web (or otherwise networked) documents to various types of objects such as images, multimedia files, portable document format (PDF) documents, and/or the like. The search service may provide, as a search result, information about various types of objects associated with a user input search query.

The above information disclosed in this Background section is only for enhancement of understanding of the background of the invention and therefore it may contain information that does not form any part of the prior art nor what the prior art may suggest to a person of ordinary skill in the art

SUMMARY

Exemplary embodiments provide an apparatus and method to facilitate identification of one or more portions of a search input corresponding to functional and/or non-functional keywords, which may be effectuated as the one or more portions of the search input are received.

Exemplary embodiments also provide an apparatus and method to display a search result associated with search input via a search input box in which the search input is displayed.

Additional aspects of the invention will be set forth in the description which follows and, in part, will be apparent from the description, or may be learned by practice of the invention.

According to exemplary embodiments, a method is provided comprising: receiving, by at least one processor, user-defined search input, determining, via the at least one processor, that at least a portion of the user-defined search input corresponds to at least one functional keyword associated with a type of object to be searched, generating classification information to facilitate identification of the at least one functional keyword among at least one other portion of the user-defined search input, and generating search information about at least one object relating to at least some of the user-defined search input based on at least some of the classification information.

According to exemplary embodiments, a computer-readable storage medium is provided, the computer-readable storage medium being configured to store at least one program, wherein the at least one program comprises instructions that when executed by at least one processor are configured to cause the at least one processor at least to: receive user-defined search input, determine that at least a portion of the user-defined search input corresponds to at least one functional keyword associated with a type of object to be searched, generate classification information to facilitate identification of the at least one functional keyword among at least one other portion of the user-defined search input, and generate search information about at least one object relating to at least some of the user-defined search input based on at least some of the classification information.

According to exemplary embodiments, an apparatus is provided comprising: an interface configured to receive user-defined search input, a keyword identification unit configured to determine that at least a portion of the user-defined search input corresponds to at least one functional keyword associated with a type of object to be searched, and generate classification information to facilitate identification of the at least one functional keyword among at least one other portion of the user-defined search input, and a search unit configured to generate search information about at least one object relating to at least some of the user-defined search input based on at least some of the classification information, wherein the interface is further configured to output the classification information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 9 is a diagram of a user interface to enable display of a search result in a search input box, according to an exemplary embodiment.

DETAILED DESCRIPTION OF THE ILLUSTRATED EMBODIMENTS

Figure 1:
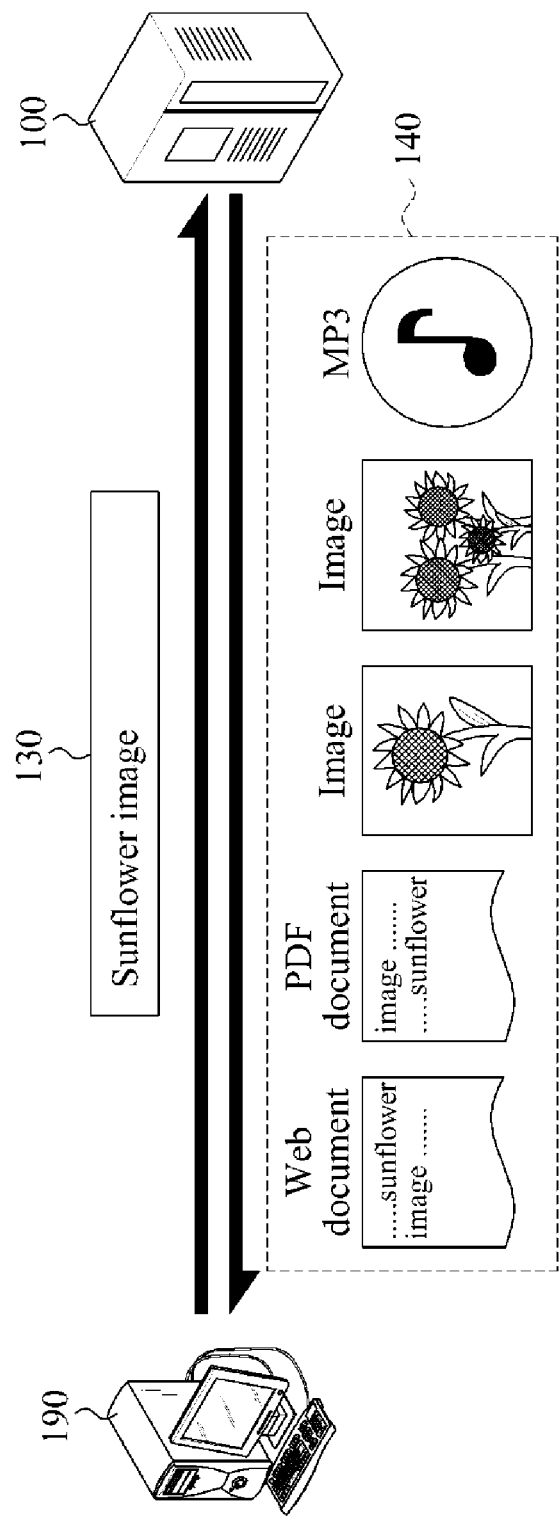
FIG. 1 is a diagram of the utilization of search text in association with a conventional networked search scheme.

In the accompanying drawings, the size and relative sizes of layers and/or regions may be exaggerated for clarity and descriptive purposes. Also, like reference numerals denote like elements.

The terminology used herein is for the purpose of describing particular embodiments only and is not intended to be limiting. As used herein, the singular forms "a", "an" and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense unless expressly defined as such herein.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a diagram of the utilization of search text in association with a conventional networked search scheme. For instance, the networked search scheme may correspond to an Internet search scheme and, as such, will be described in association therewith.

A terminal 190 may correspond to a device used by a user to perform an Internet search. The terminal 190 may correspond to any suitable device capable of exchanging (e.g., sending and receiving) information over one or more communication networks, such as, for example, a personal computer (PC), personal digital assistant (PDA), a smart phone, customized hardware, and the like. The terminal 190 may transmit, to a search server 100, search text (or a search query) 130, which may be input to terminal 190 by, for example, the user. In certain embodiments, the search server 100 and the terminal 190 may correspond to the same device.

The search text 130 may include one or more characters (e.g., one or more characters characteristic to a native language of various countries, such as, for example, Korean, English, Japanese, Chinese, and the like), numbers, symbols, special characters, and/or the like.

The search server 100 may receive the search text 130, and in response thereto, transmit, to the terminal 190, a search result 140 corresponding to the received search text 130. The search result 140 may provide information about one or more objects associated with the search text 130, among objects accessible to search server 100 and/or terminal 190 via the Internet and/or any other suitable communication network. In this manner, search result 140 may be generated by search server 100 based on at least a portion of at least one character string included in the search text 130 or the search text as a whole.

An object may have a type. A type of an object may correspond to a web document type, a portable document format (PDF) document type, a PowerPoint document type, an image type, a music file (for example, motion picture experts group (MPEG) audio layer-3 (MP3)), a moving image (e.g., movie) file, and the like, as well as combinations thereof.

Information about an object may include a summary of the object, a portion of content of the object, metadata of the object, a thumbnail (or preview) of the object, a link to the object, and the like.

As seen in FIG. 1, the search result 140 may include a web document object or a PDF document object including a character string "sunflower" and "image," or an object of an "image" type associated with "sunflower." By way of example, an object including a description in which content of an image indicates "sunflower" in metadata, or an object in which a web document having an image includes a character string "sunflower," an object of an MP3 file type associated with "sunflower" and "image," and the like, may be included in the search result 140.

In this example, when it is described that "image" is associated with "sunflower," a description in which content of an image indicates "sunflower" may be expressed in metadata of the image, or a web document having an image may include a character string "sunflower."

Further, when it is described that an MP3 file is associated with "sunflower" and "image," metadata of the MP3 file, for example, may correspond to a title, a composer, lyrics, an album name, and the like, and may include "sunflower" and "image."

Figure 2:
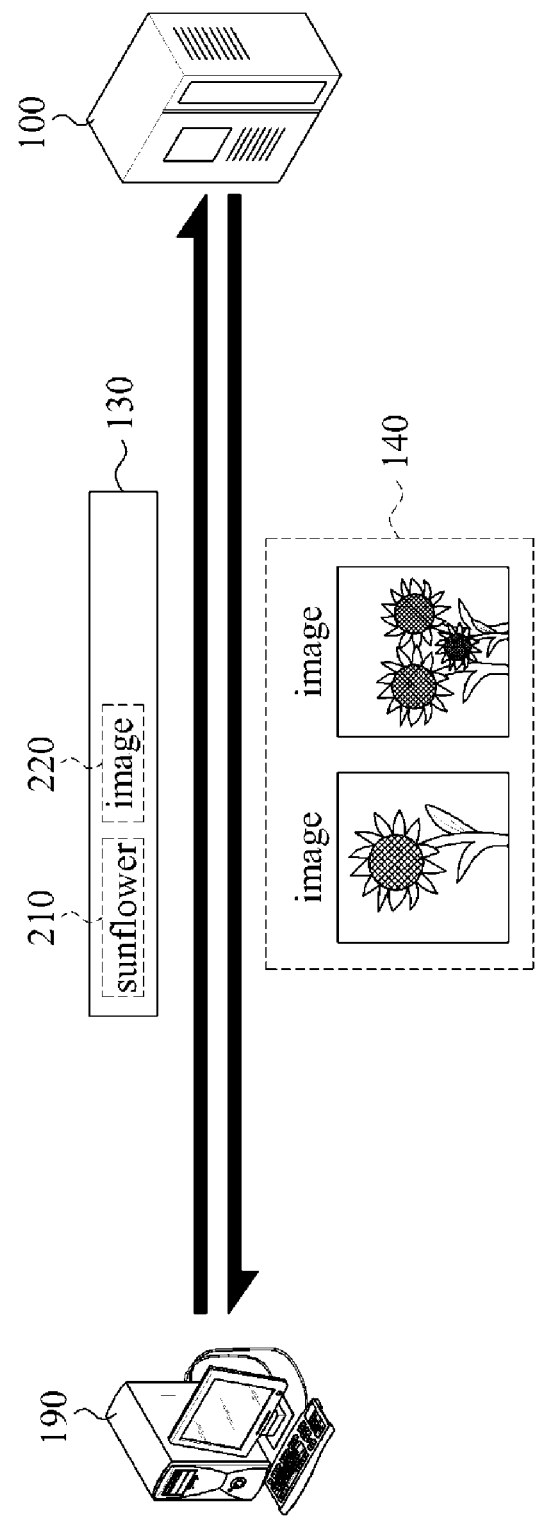
FIG. 2 is a diagram of the utilization of at least one functional keyword in association with a networked search scheme, according to an exemplary embodiment.

FIG. 2 is a diagram of the utilization of at least one functional keyword in association with a networked search scheme, according to an exemplary embodiment. According to various exemplary embodiments, the networked search scheme may correspond to an Internet search scheme.

A user may desire a search result 140 corresponding to information about objects of a predetermined type. For example, "image" in a search input 130 may indicate that the user desires to search for objects of an image type, and "sunflower" in the search input 130 may indicate that the user desires to search for objects associated with "sunflower" among objects of the image type. In this manner, search result 140 may be provided to only include information about image objects and, as such, the user may obtain the desired information by performing a relatively easy search for the search result 140.

A portion of, for instance, text in the search input 130 indicating a type of an object may be referred to as a functional keyword. The functional keyword may indicate a type of object corresponding to an intended search target. That is, the functional keyword may indicate a keyword performing a function corresponding to a type of command. A portion of, for instance, text in the search input 130 excluding the functional keyword may be referred to as a non-functional keyword. Although only one functional and one non-functional keyword are illustrated, it is contemplated that any number of suitable functional and/or non-functional keywords may be utilized in association with the networked search scheme. For instance, search input 130 may correspond to "sunflower image music." In this manner, an intended search target may be directed to both images of sunflowers, as well as music associated with sunflowers. As another example, search input 130 may correspond to "sunflower rose image" and, as such, an intended search target may be directed to images of sunflowers and roses.

According to various exemplary embodiments, search server 100 may be configured to extract a portion of received search input 130 corresponding to a functional keyword 220, and classify another (or remaining) portion of the received search input 130 as a non-functional keyword 210. In those instances when one or more functional and/or non-functional keywords are utilized, search server 100 may be configured to extract and classify functional keywords from non-functional keywords. This may be achieved based on one or more contextual constructs of search input 130. For example, search input 130 may correspond to "sunflower and rose image." Based on the contextual construct of search input 130, search server 100 may be configured to extract one or more of "sunflower," "rose," and "sunflower and rose," as non-functional keywords, and image as a functional keyword.

According to various other embodiments, the contextual construct may be utilized to daisy-chain (or otherwise link) a plurality of searches and, thereby, receive a plurality of corresponding search results. For instance, search input 130 may correspond to "sunflower image rose music." In this manner, search server 130 may be configured to extract "sunflower" and "rose" as non-functional keywords, and "image" and "music" as functional keywords. To this end, the contextual construct of search input 130 may be utilized by search server 100 to determine that functional keyword "image" is associated with non-functional keyword "sunflower," and functional keyword "music" is associated with non-functional keyword "rose." As such, search server 100 may be configured to return a plurality of search results 140 corresponding to images of sunflowers and music associated with roses.

According to certain embodiments, one or more portions of search input 130 may not be intended to be used as corresponding functional keyword(s). Thus, the search server 100 may be configured to provide information about search input (e.g., text) recognized as potential functional keyword(s) 220. In this manner, users can be enabled to exclude one or more portions of search input 130 (e.g., text) initially recognized as one or more functional keywords 220, from being utilized by search server 100 as functional keyword(s). For instance, search input 130 may correspond to "music image," such that search server 100 may initially flag "music" and "image" as functional keywords and provide a corresponding indication to terminal 190. As such, a user of terminal 190 may be enabled to indicate that "music" does not corresponding to a functional keyword and, thereby, is to be considered as a non-functional keyword 210. To this end, the user may further be enabled to indicate that "image" should be considered as a functional keyword 220. Accordingly, search server 100 may be configured to utilize these indications to conduct (or refine) a corresponding search query. In the above-noted example, the indications could be utilized by search server 100 to tailor a search query to return images of music.

Accordingly to various exemplary embodiments, information input as search input 130 may be dynamically received by search server 100 as the information is correspondingly input. To this end, search server 100 may be configured to dynamically recognize and, thereby, flag one or more portions of search input 130 as functional and/or non-functional keywords as such keywords are input. Thus, when a portion of the search input 130 is transmitted to the search server 100, the search server 100 may correspondingly (e.g., substantially immediately) provide an indication that a portion of the search input 130 is being recognized and, thereby, flagged as a functional keyword 220 or a non-functional keyword 210. Alternatively (or additionally), terminal 190 may be configured to dynamically recognize and flag the information as it is correspondingly input. As such, one or more of a terminal 190 and the search server 100 may analyze the search input 130 as it is dynamically input, and correspondingly provide an indication that a determined portion of, for example, input text is being initially recognized as a non-functional 210 or a functional keyword 220. To this end, the dynamic indication of functional and non-functional keywords may dynamically change as search input 130 is received by one or more of terminal 190 and search server 100. For instance, search input 130 may correspond to "musician image." Thus, as the text "musician" is input, an indication may be initially provided that input "music" is being recognized as a functional keyword, but as input "ian" is added, the indication may dynamically change to recognizing "musici," "musicia," and/or "musician" as a non-functional keyword. It is also contemplated that one or more of the recognition and indication of classifying at least a portion of search input 130 as a functional or non-functional keyword may be delayed, such as, for example, until a clear indication that the at least a portion of search input 130 is a complete portion, e.g., word. For example, the recognition and/or indication of the functional or non-functional classification of "musician" may be delayed until it is clear that "musician" is complete. To this end, dynamic recognition may be implemented, whereas the indication of the functional or non-functional status may be delayed until the corresponding portion of search input 130 is input.

According to certain exemplary embodiments, when the recognition of at least a portion of search input 130 fails to match the intent of a user, the portion of search input 130 may be excluded from the functional keyword 220 or non-functional keyword 210 classification, by the user, such as before and/or after the input of search input 130 is complete. In various exemplary embodiments, the recognition and/or indication of at least a portion of search input 130 may be limited to recognizing and/or indicating functional keywords 220 or non-functional keywords 210. In other words, only functional keywords (or, alternatively, only non-functional keywords) may be recognized and/or indicated. For example, only those portions of search input 130 corresponding to functional keywords 220 may be recognized and indicated to users; however, both functional keywords 220 and non-functional keywords 210 may be recognized. In this manner, those words not recognized as functional keywords 220 may be considered as non-functional keywords 210.

Accordingly to various exemplary embodiments, the rate at which the portions of search input 130 are recognized and/or indicated as corresponding to functional keywords 220 and/or non-functional keywords 210 may be controlled via one or more parameters. For instance, one or more parameters may be configured to control the above-noted dynamic recognition and/or indication of portions of search input 130. In this manner, one or more service parameters may be configured to control the amount of delay imposed before the recognition and/or indication features become available. Further, the identification of functional keywords 220 and/or non-functional keywords 210 may be user-enabled and, thereby, user-disabled via one or more parameters. In certain exemplary embodiments, one or more of the above-noted (and/or various other) parameters may be user-defined. Additionally (or alternatively), one or more of the above-noted (and/or various other) parameters may be controlled by one or more service providers of the search service.

Figure 3:
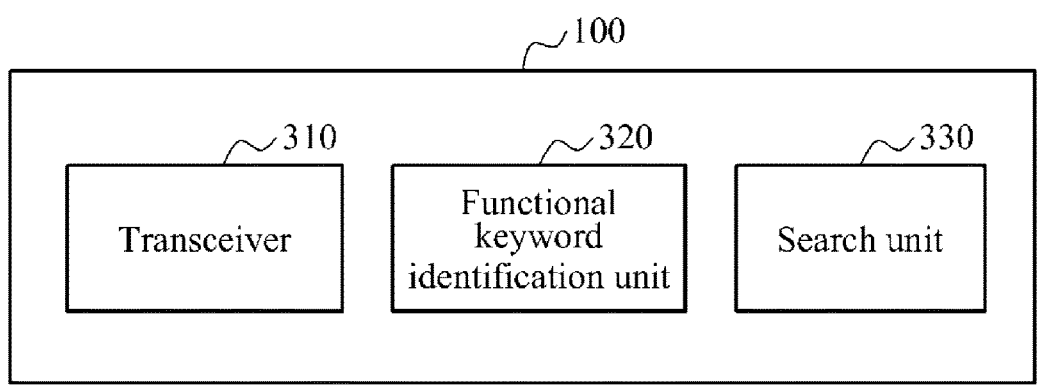
FIG. 3 is a block diagram of a search server, according to an exemplary embodiment.

FIG. 3 is a block diagram of a search server, according to an exemplary embodiment. By way of example, search server 100 may comprise computing hardware, as well as include one or more other components configured to execute one or more of the processes described herein. As shown, search server 100 includes a transceiver (or communication interface) 310, a keyword identification unit (or module) 320, and a search unit (or module) 330. It is contemplated, however, that search server 100 may embody many forms and include multiple and/or alternative components. For example, it is contemplated that the one or more components of search server 100 may be combined, located in separate structures, and/or separate physical locations. In other words, a specific topology is not critical to embodiments of search server 100. Further, as previously indicated, one or more features and functions provided by search server 100 may be assumed (or otherwise provided) by terminal 190. As such, one or more of the components of search server 100 may be additionally or alternatively provided in association with terminal 190.

According to various exemplary embodiments, transceiver 310 may be configured to exchange information with other devices (e.g., terminal 190) via one or more communication networks (now shown), such as one or more wired and/or wireless communication networks. For instance, transceiver 310 may be configured to communication over one or more public and/or private networks, such the Internet, one or more private networks of one or more service providers, etc. In this manner, transceiver 310 may be particularly configured to receive search input, e.g., search input 130 of FIG. 2, whether dynamically, in-stages, or as a complete search input. Thus, transceiver 310 may receive, from the terminal 190, user-defined search input that is input to terminal 190 by a user.

Keyword identification unit 320 may be configured to receive information from transceiver 310 corresponding to search input 130. In this manner, keyword identification unit 320 may be configured to extract one or more portions of the input, e.g., text, from the search input 130, such as one or more portions corresponding to one or more functional keywords 220 and/or non-functional keywords 210, as described in association with FIG. 2. The extracted portions may be analyzed and, thereby, classified as corresponding to functional and/or non-functional keywords. According to various exemplary embodiments, the functional and/or non-functional keywords may indicate a type of an object corresponding to an intended search target. To this end, the functional keyword identification unit 320 may be further configured to generate information to facilitate identification of a functional or non-functional keyword. This generated information may be directly conveyed or utilized to convey the classified nature of the keyword to a user to inform the user about the functional and/or non-functional recognition by search server 100.

Accordingly, keyword identification unit 320 may be further configured to provide the indication of the classification of one or more portions of search input 130 to terminal 190 via transceiver 310. To this end, keyword indication unit 320 may be configured to receive, in certain instances, reclassification information from terminal 190 via transceiver 310. This reclassification information may be utilized by keyword indication unit 320 to reclassify one or more portions of search input 130. For example, reclassification information may be received by keyword indication unit 320 to enable keyword indication unit 320 to reclassify a previously classified functional keyword as a non-functional keyword. As such, keyword indication unit 320 may be further configured to communicate updated classification information to terminal 190, via transceiver 310, to facilitate conveyance of the reclassification to a user of terminal 190.

Search unit 330, according to various exemplary embodiments, may be configured to receive information corresponding to search input 130 from one or more of transceiver 310 and keyword identification unit 320. For instance, search unit 330 may be configured to receive information corresponding to search input 130 from transceiver 310 and classification information of one or more portions of search input 130 from keyword identification unit 320. Alternatively, information received from keyword identification unit 320 may be configured to convey search input 130, as well as the classified status of various portions of search input 130. Based on the received information corresponding to search input 130, search unit 320 may be configured to generate and/or retrieve corresponding search information about at least one object. The search information may be utilized as a search result or may be utilized to generate the search result, such as the search result 140 of FIG. 2. In association herewith, search unit 330 may be configured to query one or more local and/or networked repositories (or any other suitable site) for or to generate the search information. As such, search unit 320 may be further configured to communicate with such repositories, sites, etc., via transceiver 310.

According to various exemplary embodiments, a type of the at least one object may correspond to a type indicated by a keyword, such as a functional keyword 220. Content of the at least one object may correspond to a portion of the search input 130 excluding the portion classified a functional keyword 220, such as the portion(s) classified as non-functional keyword(s) 210 or not classified as functional keyword 220. The search information corresponding to an object may include a summary of the object, a portion of content defining the object, metadata (or metacontent) characterizing or somehow describing the object, a preview of the object, a link to the object, and/or the like. Accordingly, it is generally noted that the search information may be provided as part of and/or utilized to generate search result 140. To this end, a user receiving search result 140 at, for example, terminal 190 may be enabled to select an object (or any other suitable portion of search result 140) that is desired by the user among a plurality of objects (or other portions) that are selectable by using (or based on) the search information about an object.

Accordingly, search unit 320 may be further configured to transmit at least some of the search information and/or search result 140 to terminal 190, via transceiver 310.

Figure 4:
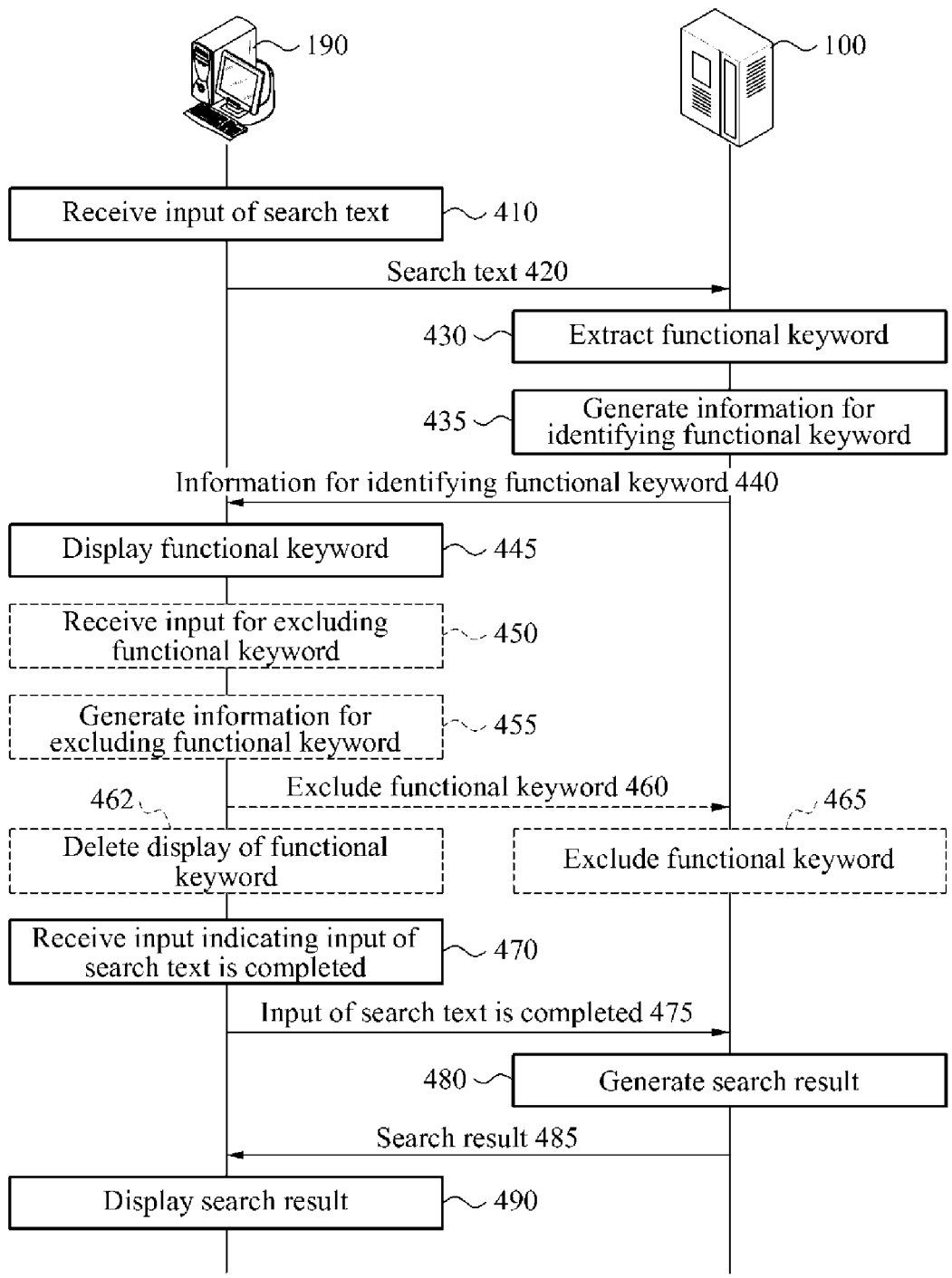
FIG. 4 is a flowchart of a process to provide a search service, according to an exemplary embodiment.

FIG. 4 is a flowchart of a process to provide a search service, according to an exemplary embodiment. For illustrative purposes, the process is described in association with FIGS. 2 and 3, as well as in the context of an exchange of information between terminal 190 and search server 100. It is contemplated; however, that the process of FIG. 4 is equally applicable to those instances when terminal 190 assumes one or more of the functions of search server 100. Further, it is generally noted that the operations of the process may be performed in any suitable order, as well as combined or separated in any suitable manner.

At operation 410, the terminal 190 may receive an input corresponding to search input 130.

In operation 420, the input corresponding to search input 130 may be transmitted to search server 100 and, thereby, received at search server 100 via transceiver 310. As previously mentioned, search input 130 may be dynamically transmitted and, thereby, received, such as per one or more input characters, per one or more input keywords, etc. Alternatively, search input 130 may be transmitted and, thereby, received at search server 100 once search input 130 is completely input. It is noted that the exemplary process of FIG. 4 is described in association with terminal 190 transmitting and, thereby, search server 100 receiving a complete search input 130, such as "sunflower image."

Accordingly, keyword identification unit 320 may receive search input 130 via transceiver 310. Thus, per operation 430, the keyword identification unit 320 may extract at least a portion of search input 130 corresponding to, for instance, the functional keyword 220 of FIG. 2. Additionally (or alternatively), keyword identification unit 320 may be configured to extract at least a portion of search input 130 corresponding to, for instance, non-functional keyword 210. An exemplary scheme to extract, by keyword identification unit 320, at least a portion of search input 130 corresponding to one or more functional and/or non-functional keywords is described in more detail with reference to FIG. 5. Thus, in operation 435, the keyword identification unit 320 may generate classification information to facilitate identification of corresponding functional and/or non-functional keywords.

At operation 440, keyword identification unit 320 may transmit, via transceiver 310, the classification information to terminal 190 to facilitate identification of one or more keyword.

In operation 445, the terminal 190 may receive the classification information and, thereby, use the classification information to provide an indication of the functional and/or non-functional keywords of search input 130. For instance, a portion of input text corresponding to the functional keyword 220 in search input 130 may be displayed via terminal 190 to clearly differentiate the display of functional keyword 220 from non-functional keyword 210, as well as to provide an indication that functional keyword 220 and/or non-functional keyword 210 has been correspondingly classified. According to one embodiment, the classification information may be utilized by terminal 190 to add (or otherwise append) a mark to, for instance, the portion of classified text corresponding to the functional keyword 220 to indicate that the portion of classified text has been classified as a functional keyword. In this manner, the identification may further indicate that the marked portion of search input 130 has been recognized and, thereby, initially selected as the functional keyword 220 by the search server 100. While described in association with extracting, classifying, and identifying a functional keyword, the same may be true for non-functional keywords, which may be additionally or alternatively identified as such. It is noted; however, that in those embodiments where the identification of both functional and non-functional keywords are implemented, the identification of the functional keywords may be clearly distinguishable from non-functional keywords. An exemplary process to facilitate identification of at least one portion of search input, such as search input 130, is described in more detail in association with reference to FIG. 6.

At times, one or more of the classified keywords corresponding to, for example, the functional keyword 220 and/or non-functional keyword 210 may not be in accordance with the intent of a user. As such, the user may be given the opportunity to perceive the identification of the various portions of search input 130 corresponding to, for instance, the functional keyword 220, so that the user may verify that the classified portion has been classified according to their intent or contrary to their intent. If contrary to the intent of the user, operations 450 through 465 may be caused to occur.

In operation 450, the terminal 190 may receive one or more user inputs to exclude from, for example, the functional keyword classification, a portion of search input 130 that should be alternatively classified, e.g., classified as a non-functional keyword 210 instead of being classified as functional keyword 220. An exemplary process to receive one or more inputs to exclude (or otherwise reclassify) one or more initially classified portions of search input 130 will be described in more detail with reference to FIG. 7. In certain embodiments, reclassification information may be generated based on user selection of the initially classified keyword that has been classified contrary to the intent of the user.

At operation 455, the terminal 190 may generate reclassification information to exclude (or otherwise reclassify) a keyword that has been classified contrary to the intent of a user, such as generate reclassification information to reclassify a functional keyword 220 as a non-functional keyword 210.

According to various exemplary embodiments, the reclassification information may be transmitted to search server 100 by terminal 190 and, thereby, received at search server 100 via transceiver 310, per operation 460. In this manner, the terminal 190 may, per operation 462, delete a mark (or other corresponding indicia) utilized to indicate a functional or non-functional keyword from a portion of search input 130 that has been classified contrary to the intent of a user. That is, terminal 190 may, in response to the one or more user inputs to terminal 190 to reclassify a portion of search input 130, remove a mark (or other indicia) utilized to facilitate user identification of one or more functional and/or non-functional keywords input as search input 130. In various exemplary embodiments, it is contemplated that operation 462 may be performed before one or more of operations 455 and 460.

Transceiver 310 may be configured to port (or otherwise transmit) reclassification information to the keyword identification unit 320. In this manner, keyword identification unit 320 may, per operation 465, exclude or reclassify one or more portions of search input 130 corresponding to the reclassification information. Thus, implementation of operations 450 through 465 enable keyword identification unit 320 to exclude from, for example, functional keyword classification, one or more portions of search input 130 that have been initially classified contrary to the intent of a user based on, for example, user selection of the one or more portions of search input 130.

According to exemplary embodiments, operations 410 through 465 may be repeatedly performed in response to user addition, deletion, and/or correction of one or more portions of the search input 130. For example, each time content of the search input 130 is changed in response to, for example, a user inputting (e.g., typing on a keyboard or any other suitable input mechanism) one or more inputs to a corresponding input search interface of terminal 190, operations 420 through 465 may be performed in response thereto, such as substantially immediately thereafter. Operations 420 through 465 may be performed at predetermined intervals and/or each time the content of the search input 130 is changed to a degree greater than or equal to a predetermine level. For example, the predetermined level may relate to a modification in at least one input syllable corresponding to the Korean language or at least one word corresponding to the English language. As another example, classification may be dynamically effectuated on a per letter basis in the English language, such that the classification may dynamically change as various characters are input to terminal 190. To this end, reclassification features may be made available to a user once a complete word has been definitively input to terminal 190.

At operation 470, the terminal 190 may receive user input indicating that search input 130 is completed. Exemplary reception of user input indicating that search input 130 is completed is described in more detail in association with FIG. 7.

In operation 475, terminal 190 is configured to, in response to receiving the user input indicating that search input 130 is complete, transmit the user input to search server 100. As such, search server 100, via the transceiver 310, may receive information corresponding to the user input that search input 130 is complete.

Accordingly, per operation 480, the search unit 330 may receive search input 130, including one or more classified keywords (such as one or more classified functional and/or non-functional keywords) and, thereby, may be configured to generate the search result 140. In certain embodiments, the information may be received from one or more local and/or networked sources, such as one or more repositories, sites, etc. The search result 140 may include information about at least one object. A type of the at least one object may correspond to a type indicated by the functional keyword(s) 220, and content of the at least one object may correspond to the non-functional keyword(s) 210. It is noted that the non-functional portion of search input 130 may be designated as such via implication. That is, at least one portion of search input 130 excluding the functional keyword(s) 220 may be considered non-functional keywords 210 in response to not corresponding to at least one functional keyword. The functional keyword 220 may refer to a type of an object, and the non-functional keyword 210 may refer to metadata, metacontent, or content of an object. It is noted that when operations 410 through 460 are repeatedly performed, operation 480 may be performed in response to the information indicating that search input 130 is complete has been received by search unit 330. Alternatively, when operations 410 through 460 are not repeatedly performed, operations 470 and 475 may be performed before operations 440, 450, 455, and 460. As previously mentioned, however, any other suitable order of the various operations corresponding to the process of FIG. 4 is contemplated.

In operation 485, search unit 330, via the transceiver 310, may transmit the generated search result 140 to the terminal 190.

At operation 490, the terminal 190 may receive and present (e.g., visually display, audibly convey, etc.) the search result 140 via one or more user interfaces of or associated with terminal 190.

According to various exemplary embodiments, operations 410 through 490 may be repeatedly performed in response to a user adding, deleting, correcting, and/or otherwise modifying the search input 130. For example, each time content of the search input 130 is changed in response to the user inputting information into a search input interface, the search result 140 corresponding to the search input 130 may be dynamically presented to the user via the terminal 190.

Figure 5:
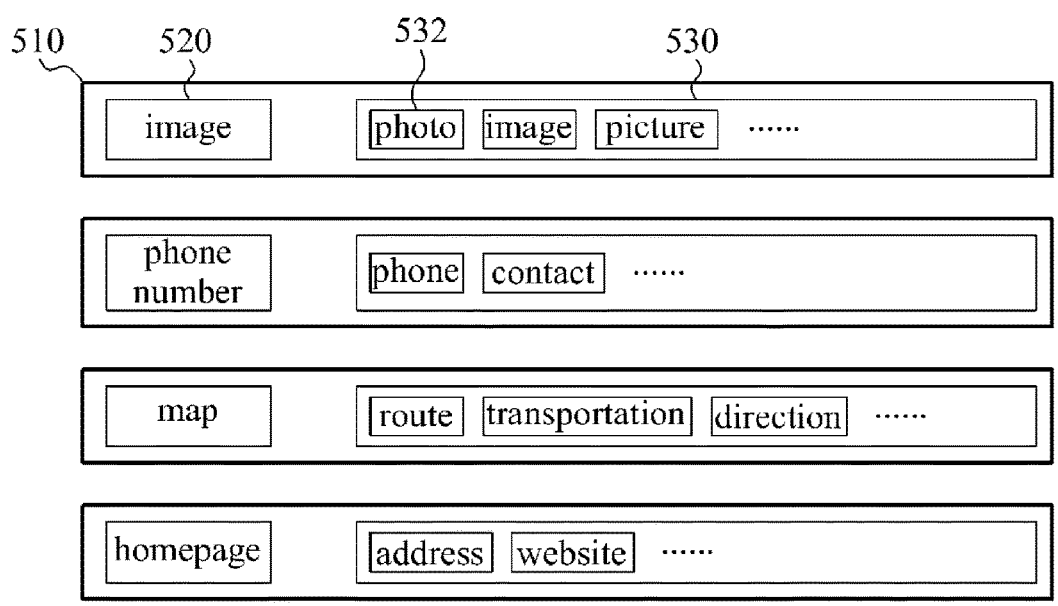
FIG. 5 is a diagram of a type of an object, according to an exemplary embodiment.

FIG. 5 is a diagram of a type of an object, according to an exemplary embodiment. As an illustrative example, FIG. 5 is described in association with classification of functional keywords; however, it is contemplated that the concepts associated therewith are similarly applicable to non-functional keywords.

According to various exemplary embodiments, the functional keyword 220 of FIG. 2 may refer to a type of an object corresponding to a search target. In operation 430 of FIG. 4, the keyword identification unit 320 may extract and/or classify a predetermined keyword character string 520 in the search input 130 of FIG. 2 corresponding to the functional keyword 220 indicating a predetermined type 510. For example, the keyword identification unit 320 may extract a character string "image" corresponding to the functional keyword 220 indicating an image object.

In operation 430, the keyword identification unit 320 may identify the functional keyword 220 using a similar keyword character string group 530 having a similar or the same meaning as the predetermined keyword character string 520. The similar keyword character string group 530 may include at least one similar keyword character string, such as keyword character string 532. The keyword identification unit 320 may extract and classify the predetermined keyword character string 520 in the search input 130 corresponding to the functional keyword 220 indicating the predetermined type 510. For example, the keyword identification unit 320 may extract and classify a character string "photo," "image," or "picture" as corresponding to the functional keyword 220 indicating an image object. The search server 100 of FIG. 2 may determine a keyword character string and a similar keyword character string group used as the functional keyword 220 based on a provided service and/or based on one or more stored keyword character strings that have been stored in association with one or more similar keyword character string groups and, thereby, one or more similar character strings.

An example of the predetermined type 510 of an object, the predetermined keyword character string 520 of the predetermined type 510, and the similar keyword character string group 530 of the predetermined type 510 is described in Table 1. The predetermined type 510 of the object is provided as an example, and is not to be limited thereto. For instance, various keyword character strings are provided below and associated with corresponding pluralities of similar keyword character strings. The type, keyword character strings, and similar keyword character strings shown below are only exemplary and it is contemplated that various other types, keyword character strings, and similar keyword character strings are contemplated.

TABLE 1

| Type | Keyword Character String | Similar Keyword Character String Group |
|---|---|---|
| web document | document | "web document" and "webpage" |
| image | image | "photo", "image", and "picture" |
| phone number | phone number | "phone" and "contact" |
| map | map | "route", "transportation", and "direction" |
| homepage | homepage | "address" and "website" |
| price | price | "bottom price" and "market price" |

According to various exemplary embodiments, a scheme of selecting an object corresponding to the non-functional keyword 210 may be different among different types of the object. An example of the predetermined type 510 of an object, and a criterion for selecting an object corresponding to the non-functional keyword 210 among objects of the predetermined type 510 is described in more detailed in association with Table 2.

TABLE 2

| Type | Criterion for selecting object corresponding to non-functional keyword |
|---|---|
| web document | In operation 480 of FIG. 4, the search unit 330 of FIG. 3 may select an object, among objects of a web document type, including a character string similar to or the same as the non-functional keyword 210, as an object corresponding to the non-functional keyword 210. |
| image | In operation 480, the search unit 330 may select an object, among objects of an image type, having a character string similar to or the same as the non-functional keyword 210 in metadata (or metacontent) of the object, or having a character string similar to or the same as the non-functional keyword 210 in a web document including the object, as an object corresponding to the non-functional keyword 210. |
| phone number | In operation 480, the search unit 330 may select an object, among objects of a phone number type, in which a name of a subject having a phone number is similar to or the same as the non-functional keyword 210, as an object corresponding to the non-functional keyword 210. |
| map | In operation 480, the search unit 330 may select an object, among objects of a map type, having a location name, a street name, an address, and the like, that is the same as or similar to the non-functional keyword 210, as an object corresponding to the non-functional keyword 210. |
| homepage | In operation 480, the search unit 330 may select an object, among objects of a homepage type, having a domain name, a title, or an owner similar to or the same as the non-functional keyword 210, as an object corresponding to the non-functional keyword 210. |
| price | In operation 480, the search unit 330 may retrieve a price of an object indicated by the non-functional keyword 210 through a price information service, and the like, and select a retrieved price as an object corresponding to the non-functional keyword 210. |

For example, when the search input 130 corresponds to "NHN homepage," the search unit 330 may identify a type of an object as a homepage, and search for a homepage related to "NHN." This may be achieved when, for instance, functional keyword 220 is established as "homepage" and non-functional keyword 210 is established as "NHN." Additionally or alternatively, search unit 330 may identify an address of a homepage, instead of a web document, including a character string "NHN" and "homepage." In this manner, "homepage" may have been reclassified by keyword identification unit 320 from being classified as a functional keyword 220 to being classified as a non-functional word 210.

As another example, when the search input 130 corresponds to "King Sejong image," the search unit 330 may identify a type of an object as an image, and search for an object associated with "King Sejong" among images instead of a web document including a character string "King Sejong" and "image." In this manner, "image" may be classified as a functional keyword 220 and "King Sejong" may be classified as a plurality of non-functional keywords 210.

In yet another example, when the search input 130 corresponds to "directions to Seoul station," the search unit 330 may identify a type of an object as a map, and provide, as a search result, a map associated with "Seoul station" or a result providing a navigation service to "Seoul station" instead of a web document including a character string "Seoul station" and "direction." That is, an object of operation 480 may refer to an object accessible via a website, for example, a resource identified by a uniform resource identifier (URI), and an object generated using a web service, for example, a map service, a transportation information service, and/or the like. According to certain exemplary embodiments, information corresponding to terminal 190 may be utilized by search server 100 to provide, for instance, navigational directions from a location corresponding to a location of terminal 190 to "Seoul station." As another example, search server 100 may provide an object such as a webpage for navigational directions, wherein the "destination" is pre-established as "Seoul station" and the "start" may be user-definable. Accordingly, the portion of search input 130 corresponding to "directions" may be classified as a functional keyword 220 and the other portions of search input 130 corresponding to "to Seoul station" may be classified as a plurality of non-functional keywords 210.

It is generally noted that the aforementioned examples are merely illustrative and, thereby, provided to demonstrate the versatility of establishing functional and/or non-functional keyword classifications to provide powerful, yet uncomplicated search technique that can better accommodate the search intent of a user.

To this end, it is also noted that information about an object generated in operation 480 may also be different among different types of the object. An example of a predetermined type 510 of an object and information of the object based on the predetermined type 510 is described in more detail in association with Table 3.

TABLE 3

| Type | Criterion for selecting object corresponding to non-functional keyword |
|---|---|
| web document | In operation 480, the search unit 330 may generate, as information about an object, a title of an object of a web document type, a portion of content included in the object, in particular, the non-functional keyword 210 and content similar to the non-functional keyword 210. |
| image | In operation 480, the search unit 330 may generate, as information about an object, a thumbnail (or preview) of an object of an image type, a portion of metadata (or metacontent), for example, a title of the object, a portion of content of a web document including the object, and the like. |
| phone number | In operation 480, the search unit 330 may generate, as information about an object, a phone number of a subject identified by the non-functional keyword 210, and the like. |
| map | In operation 480, the search unit 330 may generate, as information about an object, a thumbnail (or preview) of an object of a map type, a portion of metadata (or metacontent), for example, a title, a portion of content of a web document including the object, and the like. |

TABLE 3-continued

| Type | Criterion for selecting object corresponding to non-functional keyword |
|---|---|
| homepage | In operation 480, the search unit 330 may generate, as information about an object, a thumbnail (or preview), a title, an owner, and the like, of an object of a homepage type. |
| price | In operation 480, the search unit 330 may generate, as information about an object, a retrieved price. |

Figure 6:
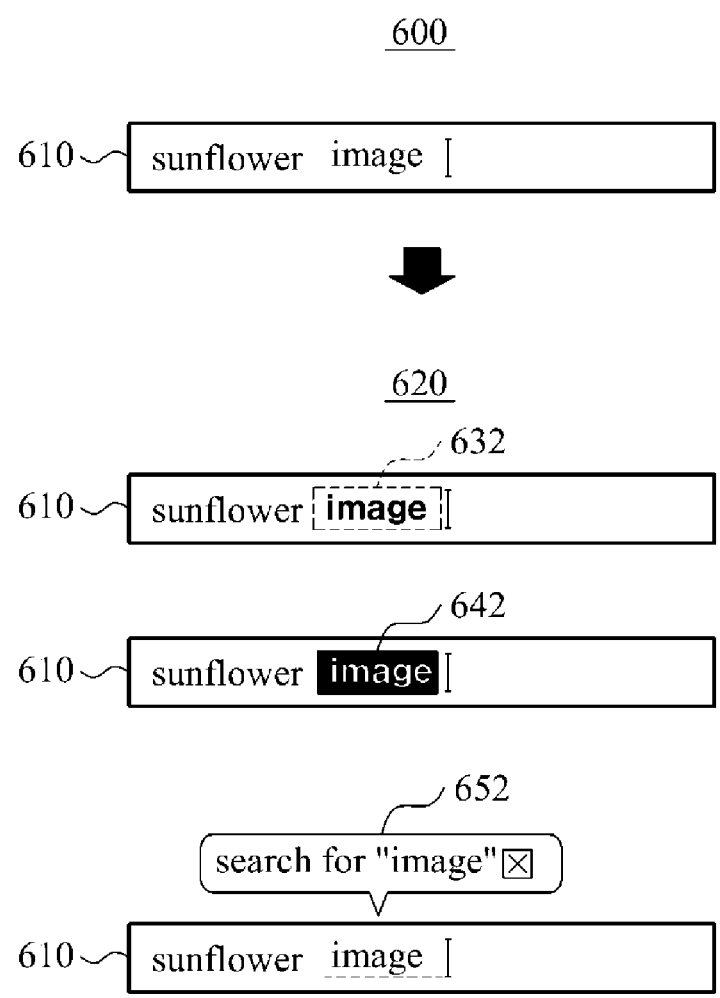
FIG. 6 is a diagram of a scheme to enable identification of one or more functional keywords, according to an exemplary embodiment.

FIG. 6 is a diagram of a scheme to enable identification of one or more functional keywords, according to an exemplary embodiment. While FIG. 6 is described in association with facilitating the identification of functional keywords, it is contemplated that the concepts described in association with FIG. 6 are similarly applicable to facilitating the identification of non-functional keywords.

As shown, a first screen 600 may describe (or otherwise present) an input text box 610.

The search text 130 of FIG. 2 input by a user may be received in the text input box 610.

A second screen 620 may illustrate a scheme of indicating at least one portion of search input 130 corresponding to the functional keyword 220 FIG. 2.

In operation 445 of FIG. 4, the terminal 190 may use received classification information to modify the display of at least one portion of search input 130 and, thereby, to facilitate identification of a functional or non-functional keyword. In this manner, at least a portion of search input 130 may be caused to be displayed visually distinct from among one or more other portions of search input 130 in the text input box 610.

The following schemes, e.g., Schemes 1 through 3, provide various illustrative examples of modifying the display of at least a portion of search input 130 classified as the functional keyword 220 using the classification information. In this manner, functional keywords may be caused to be visually distinct from non-functional keywords.

Scheme 1: A portion of text 632 selected (or classified) as the functional keyword 220 may be presented visually distinct from among other portion(s) of search input 130 based on a font of the functional keyword differing from that of another non-functional keyword. For example, the portion of text 632 may be displayed using a bold font, an italic font, an underlined font, and a font having a predetermined color, etc.

Scheme 2: A portion of text 642 may be caused to be visually distinct from among other portion(s) of search input 130 based on the functional keyword 220 being inverted, e.g., displayed white on black versus black on white for non-functional keywords.

Scheme 3: A tip tool 652 may be caused to be displayed at (or near) a top (or any other suitable portion) of a portion of search input 130 corresponding to a selected (or classified) functional keyword 220.

Accordingly, one or more display schemes may be utilized to visually distinguish functional keywords from non-functional keywords and, thereby, to facilitate the identification by a user may of the functional and/or non-functional keywords.

Figure 7:
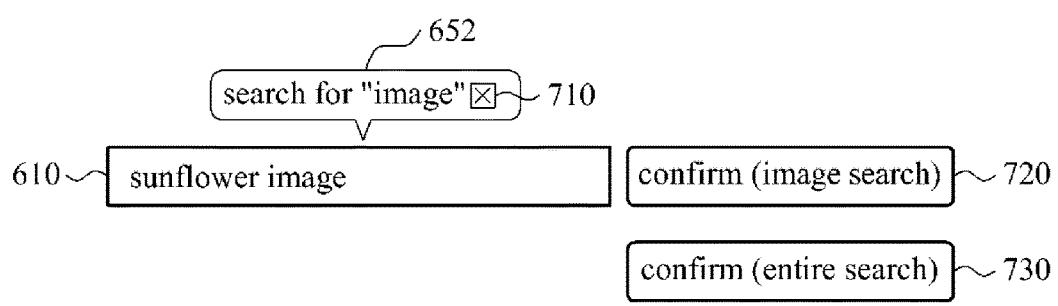
FIG. 7 is a diagram of a user interface to enable an input scheme, according to an exemplary embodiment.

FIG. 7 is a diagram of a user interface to enable an input scheme, according to an exemplary embodiment. For illustrative purposes, the user interface of FIG. 7 is described in association with FIG. 6.

As described with reference to FIG. 6, the tip tool 652 may be displayed above a portion of search input 130 classified as the functional keyword 220. In operation 450 of FIG. 4, a user may decide to exclude (or otherwise reclassify) the portion of search input 130 as being a functional keyword 220 by, for instance, interacting with (e.g., clicking on a symbol in) the tool tip 652. For instance, an "X" box 710 may be provided in association with tool tip 652, such that if the "X" box 710 is selected, the functional classification of "image" may be reclassified as non-functional.

In operation 470 of FIG. 4, the user may inform (e.g., provide input to) the terminal 190 indicating that search input 130 is complete. As seen in FIG. 7, interaction with an enter key in an input text box 610, or interaction with (e.g., clicking on) a confirm button 720, may be utilized to indicate that search input 130 is complete.

In operations 450 through 470, the user may inform, e.g., via interaction with an entire search confirm button 730, that the at least a portion of search input 130 should be excluded from being classified as a functional keyword 220 and, thereby, reclassified as a non-functional keyword 210. In this manner, interaction with entire search confirm button 730 may also provide an indication that search input 130 is complete.

Figure 8:
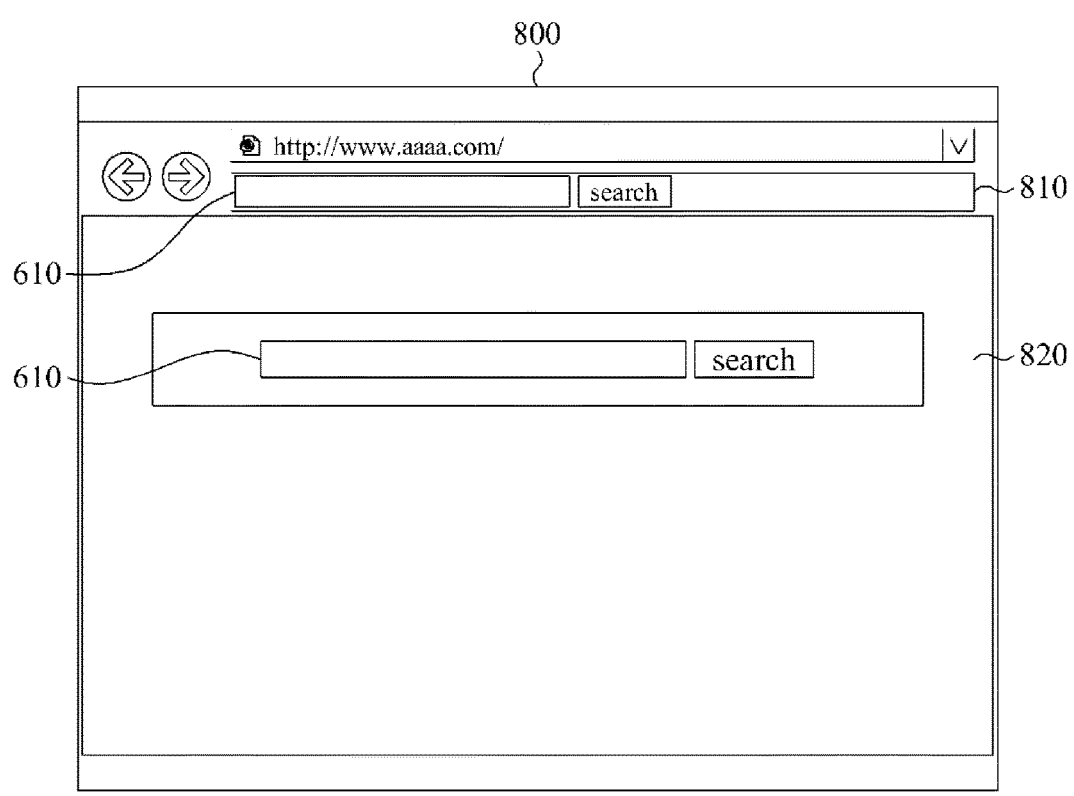
FIG. 8 is a diagram of a user interface including a search input box, according to an exemplary embodiment.

FIG. 8 is a diagram of a user interface including a search input box, according to an exemplary embodiment.

As seen in the illustrated embodiment, a screen of a web browser 800 may be displayed, or otherwise output, by the terminal 190.

The web browser 800 may include a toolbar 810 incorporated as part of the web browser 800, or installed through being downloaded from a predetermined website. In certain exemplary embodiments, toolbar 810 may be provided as a standalone search oriented widget, which may be invoked in association with the invocation web browser 800 or invoked in response to a user request for toolbar 810. As such, toolbar 810 may be provided as pop-up application, or in any other suitable manner.

Accordingly to various exemplary embodiments, the web browser 800 may display a search page 820 by accessing a web address of the search server 100. A search input box 610 may be provided via the toolbar 810 associated with the web browser 800. Additionally (or alternatively), the search input box 610 may be provided as part of search page 820 displayed via the web browser 800.

According to various exemplary embodiments, search information generated by search unit 330 may be displayed in a same search input box that is utilized to input search input 130. FIG. 9 is a diagram of a user interface to enable display of a search result in a search input box, according to an exemplary embodiment.

On a first screen 900, a functional keyword 910 indicating a phone number may be displayed via search input box 610. On a second screen 950, a functional keyword 960 indicating an exchange rate may be displayed via search input box 610.

To this end, operation 480 of FIG. 4 may include an operation of determining whether search information about at least one object may be displayed in search input box 610. When the search information about at least one object satisfies a predetermined requirement, the search unit 330 may determine that the search information about the at least one object is suitable to be displayed in the search input box 610. As such, the search unit 330 may include, as part of the search result 140, information indicating that the search information about the at least one object may be displayed in the search input box 610. In this manner, terminal 190 may utilize this information to effectuate display of the search information via search input 610.

Accordingly, at operation 490, when the search result 140 may be displayed in the search input box 610, the terminal 190 may display the search information about at least one object via the search input box 610. In those instances when the search result 140 is continuously generated in response to dynamic user input as search input 130, the search result 140 may be dynamically updated and, thereby, displayed adjacent to the search input 130 in real-time (or substantially real-time).

As shown in association with the first screen 900, the functional keyword 220 may correspond to "phone number," and the non-functional keyword 210 may correspond to "NHN." The search unit 330 may search for a phone number of "NHN" in a phone number database, and determine that a found object, e.g., "1588-0000," corresponding to the phone number of "NHN" is suitable to be displayed via the search input box 610. Thus, the search result 140 transmitted to terminal 190 via transceiver 310 may include information to facilitate display of "1588-0000" via the search input box 610. According to the search result 140, the terminal 190 may display search information about at least one object 920 via the search input box 610.

As depicted in association with the second screen 950, the functional keyword 220 may correspond to "exchange rate," and the non-functional keyword 210 may correspond "one dollar." The search unit 330 may calculate an exchange rate of "one dollar" using exchange rate information, and determine that a found, or calculated, object, e.g., "1010 won," is suitable to be displayed via the search input box 610. Thus, the search result 140 transmitted to terminal 190 via the transceiver 310 may include information for displaying "1010 won" via the search input box 610. According to the search result 140, the terminal 190 may display search information about at least one object 970 via the search input box 610.

According to various exemplary embodiments, one or more features or functions described herein may be recorded in computer-readable media including program instructions to implement various operations embodied by a computer or any other suitable device. The media may also include, alone or in combination with the program instructions, data files, data structures, and the like. The media and program instructions may be those specially designed and constructed for the purposes of the various exemplary embodiments, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments. In this manner, the instructions may be configured to be executed in association with one or more processors to effectuate the features and functions described herein.

According to various exemplary embodiments, it is possible to provide a user with classification information about at least a portion of search input recognized as a functional or non-functional keyword, such as while the user inputs the search information, e.g., search text.

According to various exemplary embodiments, it is possible to improve usability by, for instance, displaying a search result for input search information in a search input box while a user inputs the search information into the search input box.

It will be apparent to those skilled in the art that various modifications and variations can be made without departing from the spirit or scope of the invention. Thus, it is intended that the present invention cover the modifications and variations provided they come within the scope of the appended claims and their equivalents.

What is claimed is:

1. A method, comprising:
receiving, using at least one processor of a search server, user-defined search input into a search input user interface (UI) element of a search input webpage associated with the search server, the user-defined search input including a plurality of search terms, the receiving including
continuously analyzing, as the search input is being entered into the search input UI element, the user-defined search input to determine whether at least one search term of the search input is at least one functional keyword, the at least one functional keyword indicating a file type to be searched for by a search server;
generating, using the at least one processor, classification information to facilitate identification of the at least one functional keyword among the plurality of search terms in the user-defined search input;
displaying, using the at least one processor, in the search input UI element on the search input webpage the user-defined search input according to the classification information such that the at least one functional keyword is distinguished from at least one non-functional keyword of the plurality of search terms in the user-defined search input;
receiving a reclassification input from the user via the user input element indicating whether to reclassify the at least one functional keyword as a non-functional keyword;
displaying, using the at least one processor, in the search input UI element on the search input webpage the user-defined search input according to the reclassification input such that,
the at least one functional keyword is not distinguished from the at least one non-functional keyword of the plurality of search terms in the user-defined search input when the reclassification input indicates that the at least one functional keyword should be reclassified as a non-functional keyword,
the at least one functional keyword is distinguished from the at least one non-functional keyword of the plurality of search terms in the user-defined search input when the reclassification input indicates that the at least one functional keyword should not be reclassified as a non-functional keyword, and
provide a user input element configured to allow a user to verify the classification information of each word of the user-defined search input based on the reclassification input;
generating, using the at least one processor, search information about at least one object relating to at least some of the user-defined search input based on at least some of the classification information and the reclassification input; and transmitting, using the at least one processor, the generated search information for display in the search input UI element on the search input webpage.

2. The method of claim 1, wherein a type of the at least one object corresponds to a type associated with the at least one functional keyword, and wherein content of the at least one object is associated with the at least one non-functional keyword of the plurality of search terms in the user-defined search input.

3. The method of claim 1, further comprising:
receiving at least one modification to the user-defined search input,
wherein each of the receiving the user-defined search input, the continuously analyzing the user-defined search input, and the generating of classification information to facilitate identification of the at least one functional keyword among the plurality of search terms in the user-defined search input are repeatedly performed in response to the reception of the at least one modification to the user-defined search input.

4. The method of claim 1, further comprising:
receiving at least one modification to the user-defined search input,
wherein generating classification information to facilitate identification of the at least one functional keyword among the plurality of search terms in the user-defined search input is repeatedly performed in response to the reception of the at least one modification.

5. The method of claim 1, further comprising:
receiving information indicating that the user-defined search input is complete,
wherein generating the search information about the at least one object is executed in response to the reception of the information indicating that the user-defined search input is complete.

6. The method of claim 1, further comprising:
receiving information corresponding to user selection of the at least one search term from the user-defined search input; and
determining, in response to the reception of the information corresponding to the user selection, that the at least one search term from the user-defined search input corresponds to at least one non-functional keyword.

7. The method of claim 1, wherein the user-defined search input is received via at least one communication network.

8. The method of claim 1, wherein
the displaying the user defined search input according to the classification information and the displaying the user defined search input according to the reclassification input includes presenting the at least one functional keyword as visually distinct from the at least one non-functional keyword of the plurality of search terms in the user-defined search input by at least one of:
(i) using a font for the at least one functional keyword that is different than a font for the at least one non-functional keyword of the plurality of search terms in the user-defined search input,
(ii) using a background color for the at least one functional keyword that is different than a background color for the at least one non-functional keyword of the plurality of search terms in the user-defined search input, and
(iii) using a marker to indicate that the at least one functional keyword is different than the at least one non-functional keyword of the plurality of search terms in the user-defined search input.

9. The method of claim 8, wherein the visual distinction corresponds to one or more different fonts, different font colors, different background colors, and tool tips associated with the at least one functional keyword.

10. The method of claim 1, further comprising:
facilitating the user-defined search input to be received via an input text box,
wherein the input text box is provided as part of a toolbar associated with a web browser or as part of a search page presented via the web browser.

11. The method of claim 10, wherein the search information is displayed in the input text box.

12. The method of claim 11, further comprising:
determining whether the search information can be presented in the input text box.

13. The method of claim 1, wherein the type corresponds to a web document, an image, a telephone number, a map, a homepage, or a price.

14. The method of claim 1, wherein determining that at least a portion of the user-defined search input corresponds to at least one functional keyword associated with a file type to be searched for is dynamically effectuated on a per input character basis or a per input keyword basis.

15. A non-transitory computer-readable storage medium configured to store at least one program, wherein the at least one program comprises instructions that when executed by at least one processor configures the at least one processor to:
receive user-defined search input into a search input user interface (UI) element of a search input webpage associated with a search server, the user-defined search input including a plurality of search terms, the receiving including
continuously analyzing, as the search input is being entered into the search input UI element, the user-defined search input to determine whether at least one search term of the search input is at least one functional keyword associated with a file type to be searched for by a search server;
generate classification information to facilitate identification of the at least one functional keyword among the plurality of search terms in the user-defined search input;
display in the search input UI element on the search input webpage the user-defined search input according to the classification information such that the at least one functional keyword is distinguished from at least one non-functional keyword of the plurality of search terms in the user-defined search input;
receive a reclassification input from the user via the user input element indicating whether to reclassify the at least one functional keyword as a non-functional keyword;
display in the search input UI element on the search input webpage the user defined search input according to the reclassification input such that,
the at least one functional keyword is not distinguished from the at least one non-functional keyword of the plurality of search terms in the user-defined search input when the reclassification input indicates that the at least one functional keyword should be reclassified as a non-functional keyword,
the at least one functional keyword is distinguished from the at least one non-functional keyword of the plurality of search terms in the user-defined search input when the reclassification input indicates that the at least one functional keyword should not be reclassified as a non-functional keyword, and
provide a user input element configured to allow a user to verify the classification information of each word of the user-defined search input based on the reclassification input;
generate, by the search server, search information about at least one object relating to at least some of the user-defined search input based on at least some of the classification information; and
transmit the generated search information for display in the search input UI element on the search input webpage.

16. An apparatus, comprising:
a memory having computer readable instructions stored thereon; and
at least one processor configured to execute the computer readable instructions to,
receive user-defined search input into a search input user interface (UI) element of a search input webpage, the user-defined search input including a plurality of search terms, the receiving including;
continuously analyzing, as the search input is being entered into the search input UI element, the user-defined search input to determine whether at least one search term of the search input is at least one functional keyword, the at least one functional keyword indicating a file type to be searched for,
generate classification information to facilitate identification of the at least one functional keyword among the plurality of search terms in the user-defined search input,
display in the search input UI element on the search input webpage the user-defined search input according to the classification information such that the at least one functional keyword is distinguished from at least one non-functional keyword of the plurality of search terms in the user-defined search input;
receive a reclassification input from the user via the user input element indicating whether to reclassify the at least one functional keyword as a non-functional keyword;
display in the search input UI element on the search input webpage the user-defined search input according to the reclassification input such that,
the at least one functional keyword is not distinguished from the at least one non-functional keyword of the plurality of search terms in the user-defined search input when the reclassification input indicates that the at least one functional keyword should be reclassified as a non-functional keyword,
the at least one functional keyword is distinguished from the at least one non-functional keyword of the plurality of search terms in the user-defined search input when the reclassification input indicates that the at least one functional keyword should not be reclassified as a non-functional keyword, and
provide a user input element configured to allow a user to verify the classification information of each word of the user-defined search input based on a reclassification input;
generate search information about at least one object relating to at least some of the user-defined search input based on at least some of the classification information, and
transmit the generated search information for display in the search input UI element on the search input webpage.

17. The apparatus of claim 16, wherein a type of the at least one object corresponds to a type associated with the at least one functional keyword, and wherein content of the at least one object is associated with the at least one non-functional keyword of the plurality of search terms in the search input.

18. The apparatus of claim 16, wherein the at least one processor is further configured to:
receive at least one modification to the user-defined search input,
wherein each of the reception of user-defined search input, the continuously analyzing, as the search input is being entered into the search input UI element, the user-defined search input, and the generation of classification information to facilitate identification of the at least one functional keyword among the plurality of search terms in the user-defined search input, are repeatedly executed in response to the reception of the at least one modification to the user-defined search input.

19. The apparatus of claim 18, wherein the at least one processor is further configured to:
generate the search information about the at least one object in response to the reception of the at least one modification.

20. The apparatus of claim 16, wherein the at least one processor is further configured to:
receive information indicating that the user-defined search input is complete,
wherein the generation of the search information about the at least one object is in response to the reception of the information indicating that the search input is complete.

21. The apparatus of claim 16, wherein the at least one processor is further configured to:
receive information corresponding to user selection of the at least one search term from the user-defined search input; and
determine, in response to the reception of the information corresponding to the user selection, that the at least one search term from the user-defined input corresponds to at least one non-functional keyword.

22. The apparatus of claim 16, wherein the user-defined search input is received via at least one communication network.

23. The apparatus of claim 16, wherein
the displaying the user-defined search input according to the classification information and the displaying the user-defined search input according to the reclassification input includes presenting the at least one functional keyword as visually distinct the at least one non-functional keyword of the plurality of search terms in the user-defined search input by at least one of:
(i) using a font for the at least one functional keyword that is different than a font for the at least one non-functional keyword of the plurality of search terms in the user-defined search input,
(ii) using a background color for the at least one functional keyword that is different than a background color for the at least one non-functional keyword of the plurality of search terms in the user-defined search input, and
(iii) using a marker to indicate that the at least one functional keyword is different than the at least one non-functional keyword of the plurality of search terms in the user-defined search input.

24. The apparatus of claim 23, wherein the visual distinction corresponds to one or more different fonts, different font colors, different background colors, and tool tips associated with the at least one functional keyword.

25. The apparatus of claim 16, wherein the at least one processor is further configured to:
facilitate the reception of the user-defined search input via an input text box,
wherein the input text box is provided as part of a toolbar associated with a web browser or as part of a search page presented via the web browser.

26. The apparatus of claim 25, wherein the search information is displayed in the input text box.

27. The apparatus of claim 26, wherein the at least one processor is further configured to:
determine whether the search information can be presented in the input text box.

28. The apparatus of claim 16, wherein the type corresponds to a web document, an image, a telephone number, a map, a homepage, or a price.

29. The apparatus of claim 16, wherein the at least one processor is further configured to dynamically determine that the at least at least one search term from the user-defined search input corresponds to at least one functional keyword associated with a file type to be searched for on a per input character basis or a per input keyword basis.

* * * * *